(12) United States Patent
Lemke et al.

(10) Patent No.: US 11,472,380 B2
(45) Date of Patent: Oct. 18, 2022

(54) FORCE INPUT MEMBER FOR A BRAKE ACTUATING DEVICE

(71) Applicant: ZF Active Safety GmbH, Koblenz (DE)

(72) Inventors: Klaus Lemke, Hanroth (DE); Christian Freund, Melsbach (DE); Robert Barnkow, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 17/061,970

(22) Filed: Oct. 2, 2020

(65) Prior Publication Data
US 2021/0101569 A1      Apr. 8, 2021

(30) Foreign Application Priority Data
Oct. 2, 2019    (DE) .......................... 102019126693.9

(51) Int. Cl.
*F16C 7/06*    (2006.01)
*B60T 7/06*    (2006.01)
*F16B 1/00*    (2006.01)

(52) U.S. Cl.
CPC ................ *B60T 7/065* (2013.01); *F16B 1/00* (2013.01); *F16C 7/06* (2013.01);
(Continued)

(58) Field of Classification Search
CPC ...... F16C 7/02; F16C 7/04; F16C 7/06; F16C 3/035; F16C 3/03; F16C 2361/45; F16C 2202/40; G05G 1/46; F16B 7/10; F16B 2001/0035; F16B 1/00; Y10T 403/32467; E04H 12/182; B60T 7/065
See application file for complete search history.

(56) References Cited

U.S. PATENT DOCUMENTS 2,130,916 A * 9/1938 Begg ...................... B60T 11/04
                                                    188/217
3,574,293 A * 4/1971 Vriend ....................... F16J 1/16
                                                     92/84
(Continued)

FOREIGN PATENT DOCUMENTS

DE    102011016241 A1    10/2012
DE    102017221055 A1    5/2019
(Continued)

OTHER PUBLICATIONS

Machine Translation of FR 2,677,723, obtained Dec. 23, 2021.*
(Continued)

*Primary Examiner* — Brian J McGovern
(74) *Attorney, Agent, or Firm* — Robert James Harwood

(57) ABSTRACT

A force input member for a brake actuating device of a vehicle brake system includes at least one first portion connected to the brake actuating device; at least one second portion connected to a brake pedal; and at least one coupling device. The at least one coupling device couples the first portion and the second portion to one another wherein the at least one coupling device is designed to permit a relative movement between the first portion and the second portion in the case of a force acting on the force input element which is greater than or equal to a predetermined release force.

19 Claims, 9 Drawing Sheets

(52) U.S. Cl.
CPC ... *F16B 2001/0035* (2013.01); *F16C 2202/40* (2013.01); *F16C 2361/45* (2013.01)

(56) References Cited

U.S. PATENT DOCUMENTS

| | | | | |
|---|---|---|---|---|
| 4,191,280 | A * | 3/1980 | Copperwheat | B60D 1/249 |
| | | | | 188/300 |
| 6,655,230 | B1 * | 12/2003 | Rupp | B60T 7/065 |
| | | | | 74/512 |
| 9,586,457 | B2 * | 3/2017 | Jeon | B60G 21/0556 |
| 2003/0200863 | A1 * | 10/2003 | Dreischarf | B60T 7/065 |
| | | | | 92/140 |
| 2012/0007419 | A1 * | 1/2012 | Sellinger | B60T 8/409 |
| | | | | 303/15 |
| 2018/0180129 | A1 * | 6/2018 | Huck | B61D 7/18 |

FOREIGN PATENT DOCUMENTS

| | | | | | |
|---|---|---|---|---|---|
| FR | 2677723 | A1 * | 12/1992 | | B64C 27/51 |
| GB | 444914 | A * | 3/1936 | | F16C 7/04 |

OTHER PUBLICATIONS

"Coil Spring," Wikipedia Page, dated by Wayback Machine to Nov. 11, 2018, url:<https://web.archive.org/web/20181111152226/https://en.wikipedia.org/wiki/Coil_spring>.*

"Permanent Magnet Motor," Wikipedia Page, dated by Wayback Machine to Jun. 20, 2019, url:<https://web.archive.org/web/20190620201225/https://en.wikipedia.org/wiki/Permanent_magnet_motor>.*

* cited by examiner

FORCE INPUT MEMBER FOR A BRAKE ACTUATING DEVICE

CROSS-REFERENCE TO RELATED APPLICATION

This application claims priority to German Patent Application No, 102019126693.9 filed Oct. 2, 2019, the disclosure of which is incorporated herein by reference in its entirety.

TECHNICAL FIELD

The present disclosure relates to a force input member for a brake actuating device of a vehicle brake system. The present disclosure furthermore relates to a brake actuating device having a force input member of this kind.

BACKGROUND

Document DE 10 2017 221 055 A1 discloses coupling a brake master cylinder piston movably to a pedal pushrod. Moving the pedal pushrod relative to the brake master cylinder piston counter to the actuating direction of the brake master cylinder piston is permitted by mechanical play. Elastic means are provided which, when the play is utilized, exert an elasticity-induced tensile force between the brake master cylinder piston and the pedal pushrod and thus also in the pedal pushrod.

SUMMARY

It is an object of the present disclosure to provide a force input member for a brake actuating device which can ensure the functioning of the brake actuating device in the case of automatic actuation of the brake actuating device and can be coupled to various brake actuating devices.

This object is achieved by means of a force input member having the features of patent claim 1. Further embodiments will become apparent from the dependent claims.

This object is achieved by means of a force input member having the features of patent claim 1. Further embodiments will become apparent from the dependent claims.

The force input member for a brake actuating device of a vehicle brake system comprises at least one first portion, which can be connected to a brake actuating device, and at least one second portion, which can be connected to a brake pedal. The force input member furthermore has at least one coupling device, which couples the first portion and the second portion to one another. The at least one coupling device is designed to permit a relative movement between the first portion and the second portion in the case of a force acting on the force input member which is greater than or equal to a predetermined release force.

The force input member according to the disclosure is of two-part and telescopic design, wherein the telescopic function of the force input member is activated or permitted when the force acting on the force input element exceeds a predetermined release force. In other words, the at least one coupling device can provide a predetermined holding force by means of which it holds the first portion and the second portion in the initial position thereof. If this holding force, which corresponds to the release force, is exceeded, a relative movement between the first portion and the second portion is permitted.

The force acting on the force input element to initiate the telescopic function can be a tensile force. This tensile force can act in a direction which is opposite to the actuating direction of the brake actuating device. During an actuation of the brake pedal, pressure forces can be transferred to the brake actuating device by means of the force input member according to the disclosure to initiate a braking process. In the case of an actuation of the brake actuating device produced or amplified by an electric brake booster, for example, the brake pedal can be pulled or taken along by means of the force input member. During this process, the telescopic function of the force input member is not triggered since the release force is not exceeded. During an actuation of this kind, the force input member according to the disclosure can behave like a one-piece force input member. The driver therefore does not notice any change in the behavior of the brake pedal, By means of the at least one coupling device, force transmission between the first portion and the second portion of the force input member can be interrupted in accordance with the situation if there is an obstacle between the interior trim of the vehicle and the brake pedal, with the result that a relative movement between the first portion and the second portion is permitted over a certain distance by the coupling device.

By means of the force input member according to the disclosure, an actuation of the brake actuating device produced or amplified by an electric brake booster can be performed without impairment even if the brake pedal is obstructed by an obstacle, for example, and the brake pedal cannot follow the movement of the brake actuating device or force input member. An obstacle can be an object that has got into the foot well or a foot of the driver of the vehicle.

Moreover, the force input member according to the disclosure can be used with a very wide variety of brake actuating devices without the need to perform structural modifications to the brake actuating device itself.

The first portion of the force input member can have a first coupling portion. The second portion of the force input member can have a second coupling portion. The first coupling portion and the second coupling portion can be coupled to one another by means of the at least one coupling device.

The at least one coupling device can have at least one housing part. The at least one housing part can surround the first coupling portion and the second coupling portion. The at least one coupling device can have at least one return spring. The at least one return spring can transfer the first portion and the second portion back into the initial position thereof after a relative movement between the first portion and the second portion has been permitted by the coupling device. The at least one return spring can be arranged within the at least one housing part. The spring force of the at least one return spring can be less than or equal to the release force which is provided by the at least one coupling device. The at least one return spring can be arranged in such a way that, after the release force is exceeded, a relative movement between the first portion and the second portion is permitted, with elastic deformation of the return spring. The at least one return spring can be a helical spring, for example. In particular, the at least one return spring can be a compression spring.

The at least one coupling device can have at least one guide bush. The at least one guide bush can allow a low-friction relative movement between the first portion and the second portion. The at least one guide bush can be mounted on the first portion or the second portion. The guide bush can be moved, together with the portion on which it is mounted, relative to the respective other portion.

The first coupling portion can have at least one radial projection. The at least one radial projection can be formed circumferentially on the first portion. The first coupling portion can furthermore have at least one axial guide projection. The axial guide projection can adjoin the radial projection in the axial direction.

The second coupling portion can have at least one radial projection. The at least one radial projection can extend radially outward. The second coupling portion can have at least one opening or recess. The at least one radial projection can surround the opening in the second coupling portion. The at least one radial projection can form the edge of the opening in the second coupling portion. The second coupling portion can have the guide bush. The guide bush can be accommodated in the opening. The guide bush can be mounted in a fixed manner on the second coupling portion.

The radial projection on the first portion and the radial projection on the second portion can be of flange-type design. The radial projection on the first coupling portion and the radial projection on the second coupling portion can rest against one another in the initial position of the first portion and the second portion. The two radial projections can have opposite axial faces, which can rest against one another, at least in some region or regions, in the initial position of the first portion and of the second portion.

The axial guide projection can be accommodated at least partially so as to be movable in the opening in the second coupling portion. The axial guide projection can be accommodated at least partially in the at least one guide bush. The at least one guide bush can be in contact with an outer circumferential surface of the axial guide projection.

The at least one return spring can be supported on the radial projection on the second coupling portion and on the at least one housing part. The at least one housing part can have an inward-directed radial projection, on which the return spring can be supported. The at least one return spring can at least partially surround at least one of the two coupling portions. The at least one housing part can have a further inward-directed radial projection, by means of which it can be supported on the radial projection of the first coupling portion.

The at least one coupling device can have at least one coupling element. The at least one coupling element can permit the relative movement between the first portion and the second portion after the predetermined release force has been exceeded.

The at least one coupling element can have at least one magnet. In particular, the at least one coupling element can have a permanent magnet. The magnet can be arranged on the second coupling portion. The at least one magnet can be provided on the second coupling portion in such a way that it can be brought into contact with the first coupling portion. The magnet can be arranged in the region of the radial projection of the second coupling portion. The magnet can form a portion of the axial end face of the radial projection. The magnet can surround the opening in the second coupling portion. In the initial position of the first portion and of the second portion, the magnet can rest against the radial projection of the first coupling portion. In particular, an axial face of the magnet can rest against the opposite axial face of the first coupling portion.

The at least one coupling element can have at least one elastic element. The at least one elastic element can be in the form of an elastic lock, for example. The at least one elastic element can be a slotted clamping ring, for example.

The at least one elastic element can hold the first coupling portion and the second coupling portion and hence the first portion and the second portion in the initial position thereof. For this purpose, the at least one elastic element can be in contact with the first coupling portion and the second coupling portion. The at least one elastic element can be in contact with the second coupling portion via the at least one guide bush, for example. A recess, in which the elastic element engages, can be formed in the first coupling portion. The recess in the first coupling portion can be formed in the guide projection of the first coupling portion. The guide bush can likewise have a recess, in which the elastic element engages. The at least one guide bush is mounted on the second coupling portion. The at least one guide bush can be held on the second coupling portion by means of frictional engagement. The guide bush can be accommodated in the opening in the second coupling portion. Since the elastic element engages in the recess in the first coupling portion and in the recess in the guide bush, the at least one elastic element can hold the first portion and the second portion in the initial position.

If the predetermined release force is exceeded, the elastic element can be elastically deformed and permit a relative movement between the first portion and the second portion. The at least one elastic element can be pushed into the recess in the first coupling portion, for example, and thus permit a relative movement between the first portion and the second portion.

The present disclosure furthermore relates to a brake actuating device having at least one force input member. The present disclosure furthermore relates to a brake actuating device having at least one force input member.

BRIEF DESCRIPTION OF THE DRAWINGS

Illustrative embodiments of the disclosure are described below with reference to the attached figures. Of these.

DETAILED DESCRIPTION

Figure 1:
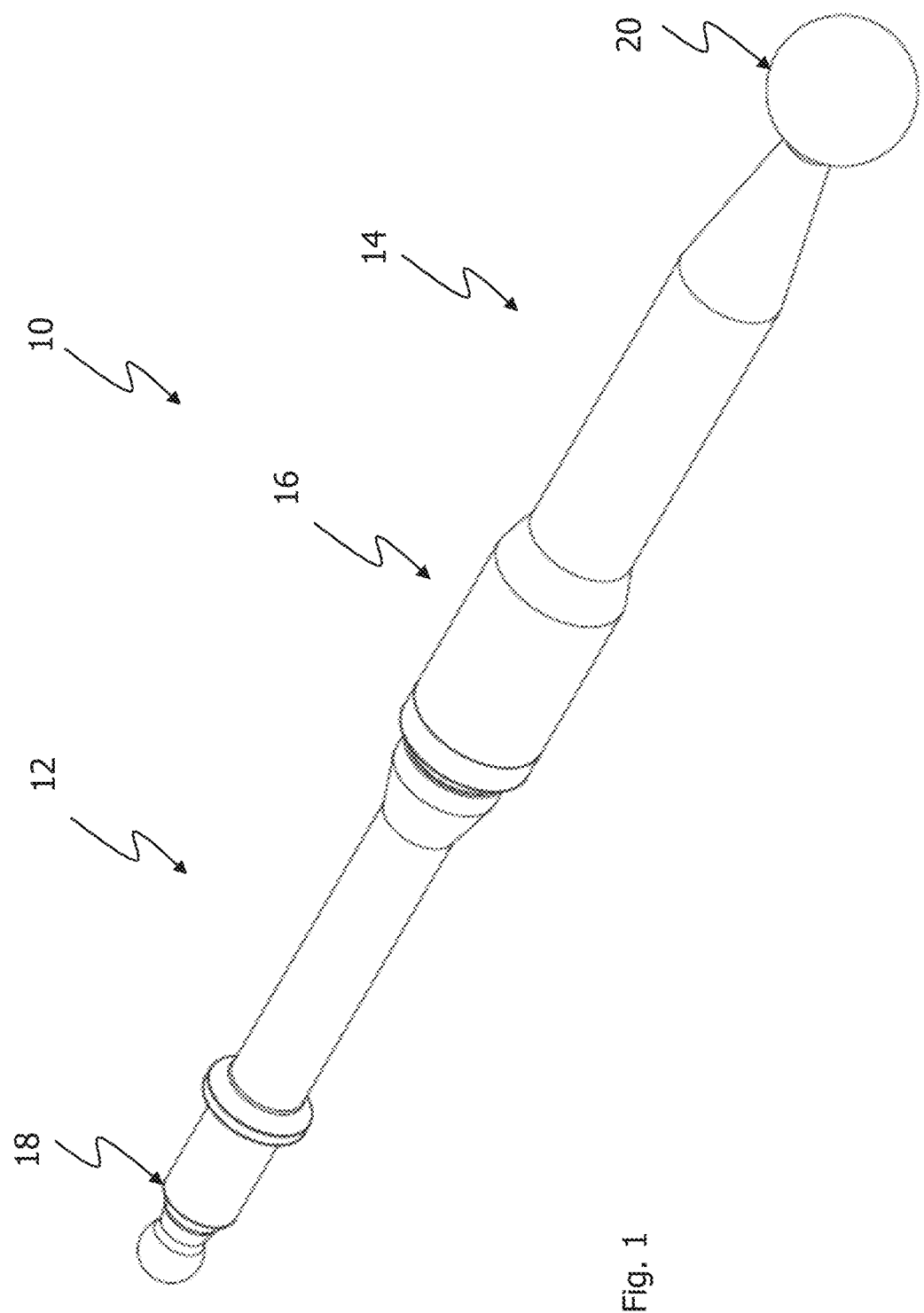
FIG. 1 illustrates a perspective view of a force input member according to one embodiment.

FIG. 1 shows a perspective view of a force input member 10. The force input member 10 comprises a first portion 12 and a second portion 14, which are coupled to one another by means of a coupling device 16. The first portion 12 can be connected via its end portion 18 to an electric brake booster (not shown). The end portion 18 has an end region of spherical design. The second portion 14 can be connected via an end portion 20 to a brake pedal (not shown). The end portion 20 also has an end region of spherical design. The coupling device 16 is formed centrally on the force input member 10. The coupling device 16 is thus situated between the end portions 18 and 20, in a central region of the force input member 10.

Figure 2:
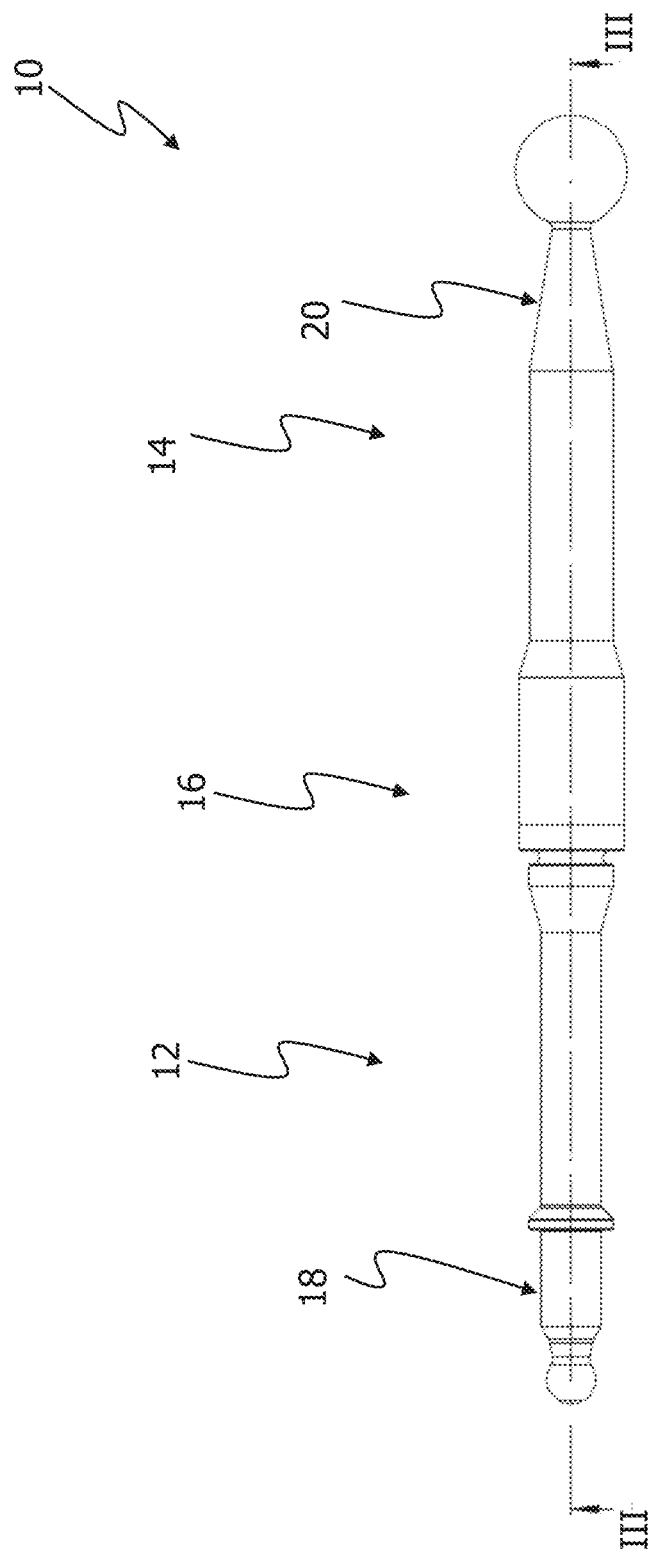
FIG. 2 illustrates a plan view of the force input member according to FIG. 1.

FIG. 2 shows a plan view of the force input member 10, in which the first portion 12, the coupling device 16 and the second portion 14 are shown. The coupling device 16 couples the ends of the portions 12 and 14 which are opposed to end portions 18 and 20.

Figure 3:
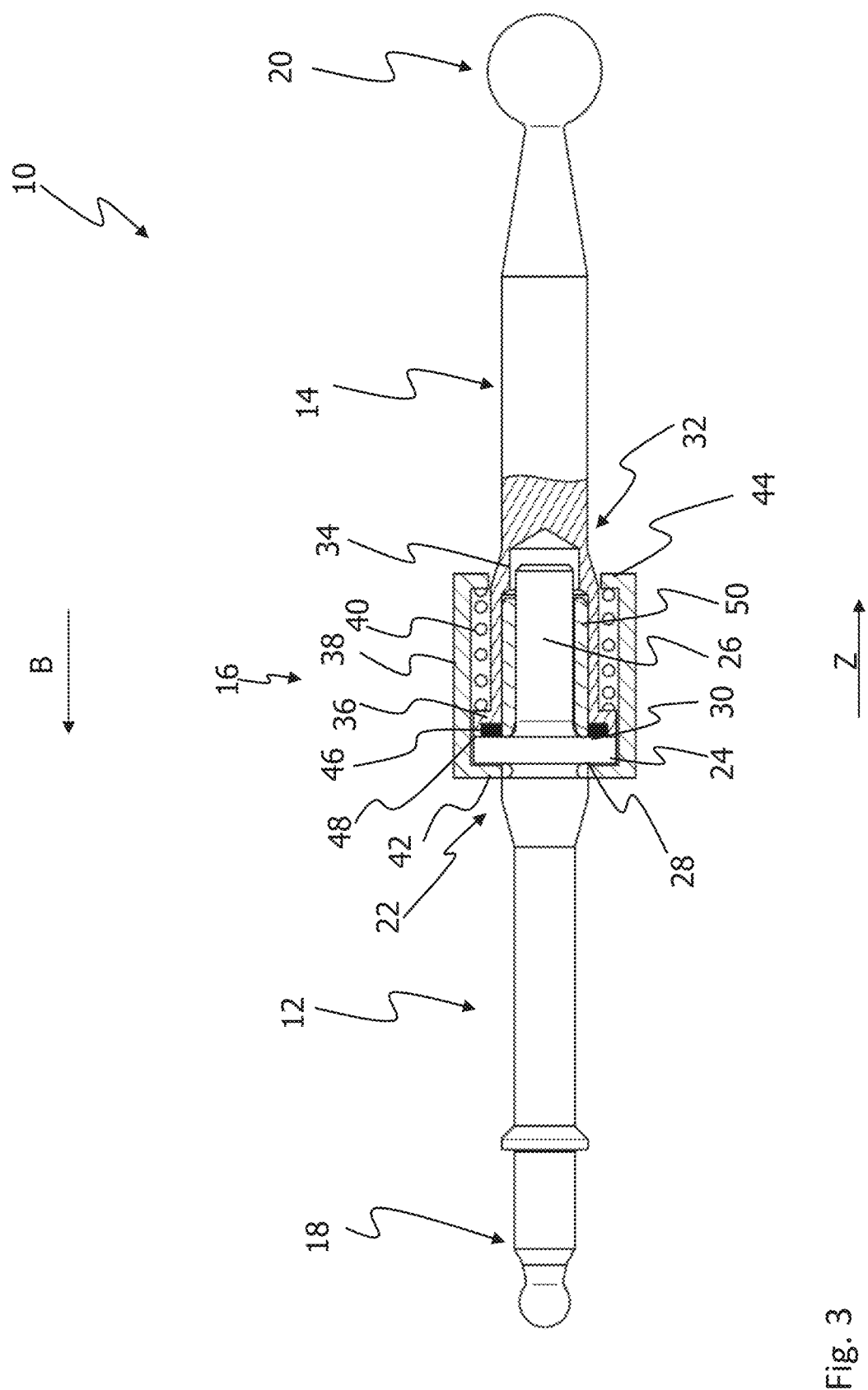
FIG. 3 illustrates a sectional view along section line in FIG. 2.
Figure 4:
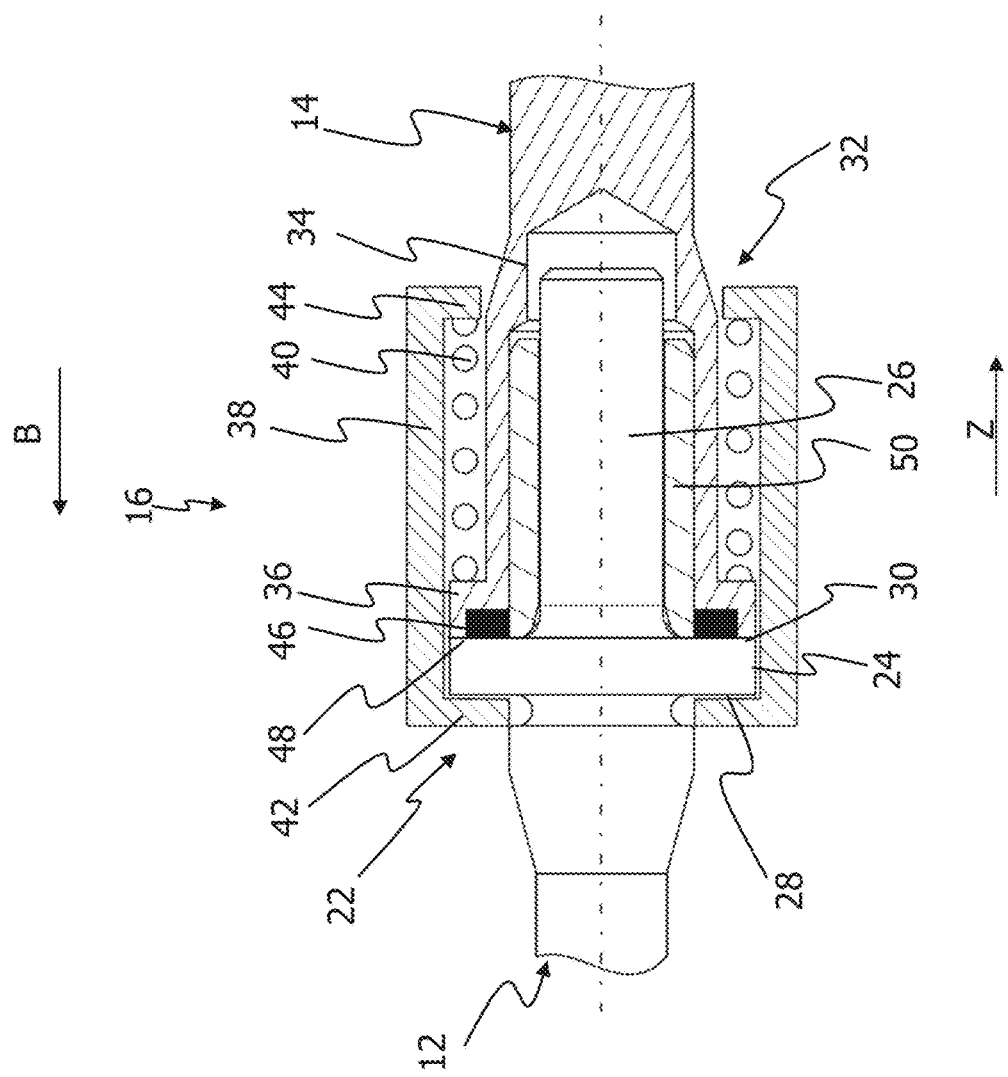
FIG. 4 illustrates an enlarged detail of the sectional view according to FIG. 3.

FIG. 3 shows a sectional view along section line III-Ill in FIG. 2, in which the coupling device 16 is illustrated in section. FIG. 4 shows an enlarged detail of the sectional view according to FIG. 3.

A first coupling portion 22 is formed on the first portion 12. The first coupling portion 22 comprises a radial projection 24 and an axial guide projection 26. The axial guide projection 26 projects in the axial direction, starting from the radial projection 24. The guide projection 26 is of cylindrical design. The radial projection 24 projects radially outward and is formed circumferentially on the first portion 12. The radial projection 24 has two mutually opposite axial faces 28 and 30.

The second portion 14 has a second coupling portion 32. The second coupling portion 32 has an opening 34 and a radial projection 36. The radial projection 34 is formed on an axial end of the second portion 14. The radial projection 34 projects radially outward and surrounds the edge of the opening 36.

The coupling device 16 has a housing part 38 and a return spring 40. The housing part 38 has two inward-directed radial portions 42 and 44. The housing part 38 rests by means of the radial portion 42 on face 28 of the radial projection 24. The return spring 40 is supported by one end on the radial projection 44 of the housing part 38. The return spring 40 is supported by its other end on the radial projection 36 of the second coupling portion 32. The return spring 40 preloads the coupling device 16 into the initial position shown in FIG. 3.

The coupling device 16 furthermore has a coupling element 46. According to this embodiment, the coupling element 46 is a magnet. The magnet can be a permanent magnet. The coupling element 46 is provided on the radial projection 36 of the second coupling portion 32. The coupling element 46 is accommodated in the radial projection 36 and forms a region of the axial end face 48 of the radial projection 36. In other words, the coupling element 46 or magnet can be integrated into the radial projection 36. The coupling element 46 can be of annular design and can surround the opening 34 in the second coupling portion 32.

A guide bush 50 is accommodated in the opening 34 of the second coupling portion 32 and is mounted on the coupling portion 32. The axial projection 26 of the first coupling portion 22 extends into the guide bush 50. The outer circumferential surface of the axial guide projection 26 can make contact at least in part with the inner circumferential surface of the guide bush 50. The guide bush 50 can ensure low-friction relative movement between the first portion 12 with the first coupling portion 22 and the second portion 14 with the second coupling portion 32.

Figure 5:
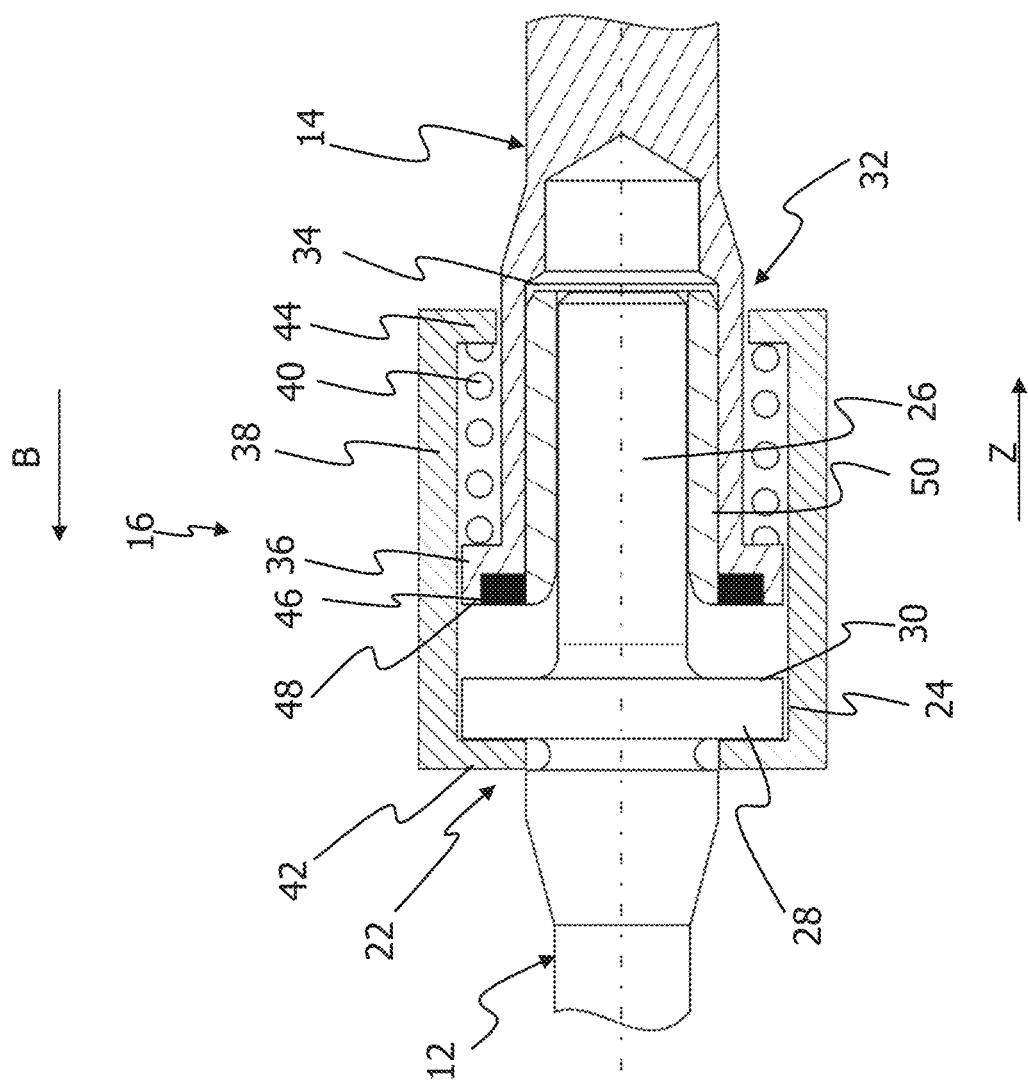
FIG. 5 illustrates an enlarged detail of the sectional view according to FIG. 3, wherein the first portion and the second portion have been moved relative to one another.

In the initial position of the coupling device 16, the axial end face 48 of the coupling portion 32 or of the radial projection 36 rests against the axial face 30 of the radial projection 24 of the first coupling portion 22. By means of its magnetic force, the magnet 46 holds the radial projection 24 of the first coupling portion 22 in contact with the radial projection 24 of the coupling portion 32. By means of its magnetic force, the magnet 46 defines a holding or release force. When the release force is exceeded, the magnetic coupling between the radial projection 24 of the first coupling portion 22 and the radial projection 36 of the second coupling portion 32 is released. Portions 12 and 14 can then move relative to one another, compressing the return spring 40. This state is illustrated in FIG. 5.

In the case of an automatic brake actuation by means of an electric brake booster (not shown), the brake pedal (not shown) mounted on the end portion 20 of the second portion 14 is taken along in the direction of the arrow B. The direction of the arrow B corresponds to the actuating direction of the brake actuating device (not shown). In this case, the coupling produced between the first portion 12 and the second portion 14 by means of the coupling device 16 is maintained. If there is an obstacle behind the brake pedal or between the brake pedal and the interior trim of the vehicle, the brake pedal cannot follow the movement of the force input member 10 in the actuating direction B. As a result, a force acting in the direction of the arrow Z is exerted on the force input member 10. If the force Z acting on the force input member 10 exceeds the predetermined holding force, the coupling provided by the magnet 46 between the radial projection 24 of the first coupling portion 22 and the radial portion 46 of the coupling portion 32 is released, with the result that a relative movement is permitted between the first portion 12 and the second portion 14 (see FIG. 5). The axial distance between the radial projection 24 of the first coupling portion 22 and the radial projection 36 of the second coupling portion 32 increases, while the return spring 40 is compressed. Owing to this permitted relative movement, an automatically initiated braking process can be performed even if there is an obstacle behind the brake pedal. The obstacle can be the foot of a driver, for example. By means of the relative movement made possible by the coupling device 16, it is also possible to prevent injuries to the driver.

Figure 6:
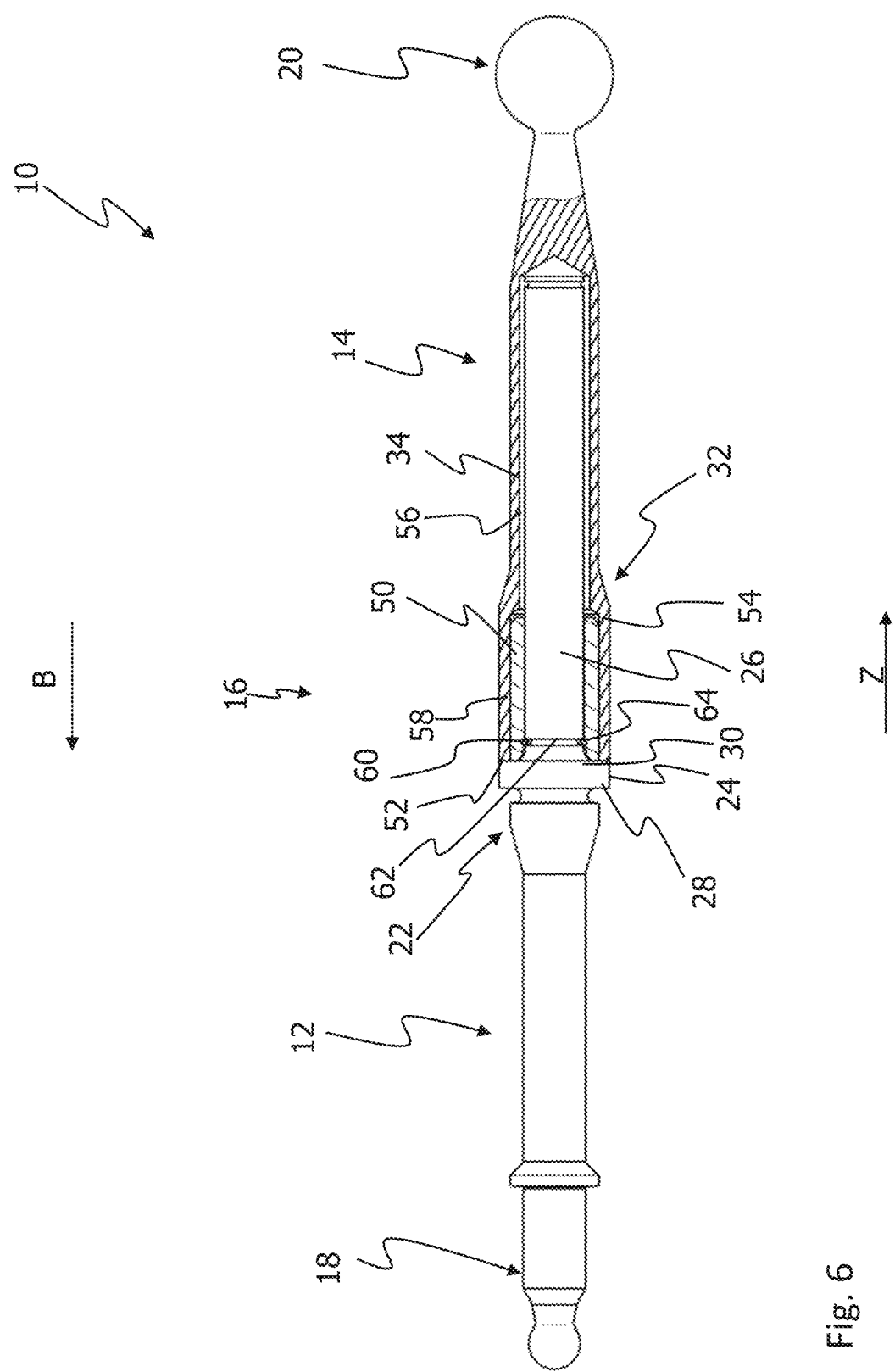
FIG. 6 illustrates a sectional view of a force input member according to another embodiment.
Figure 7:
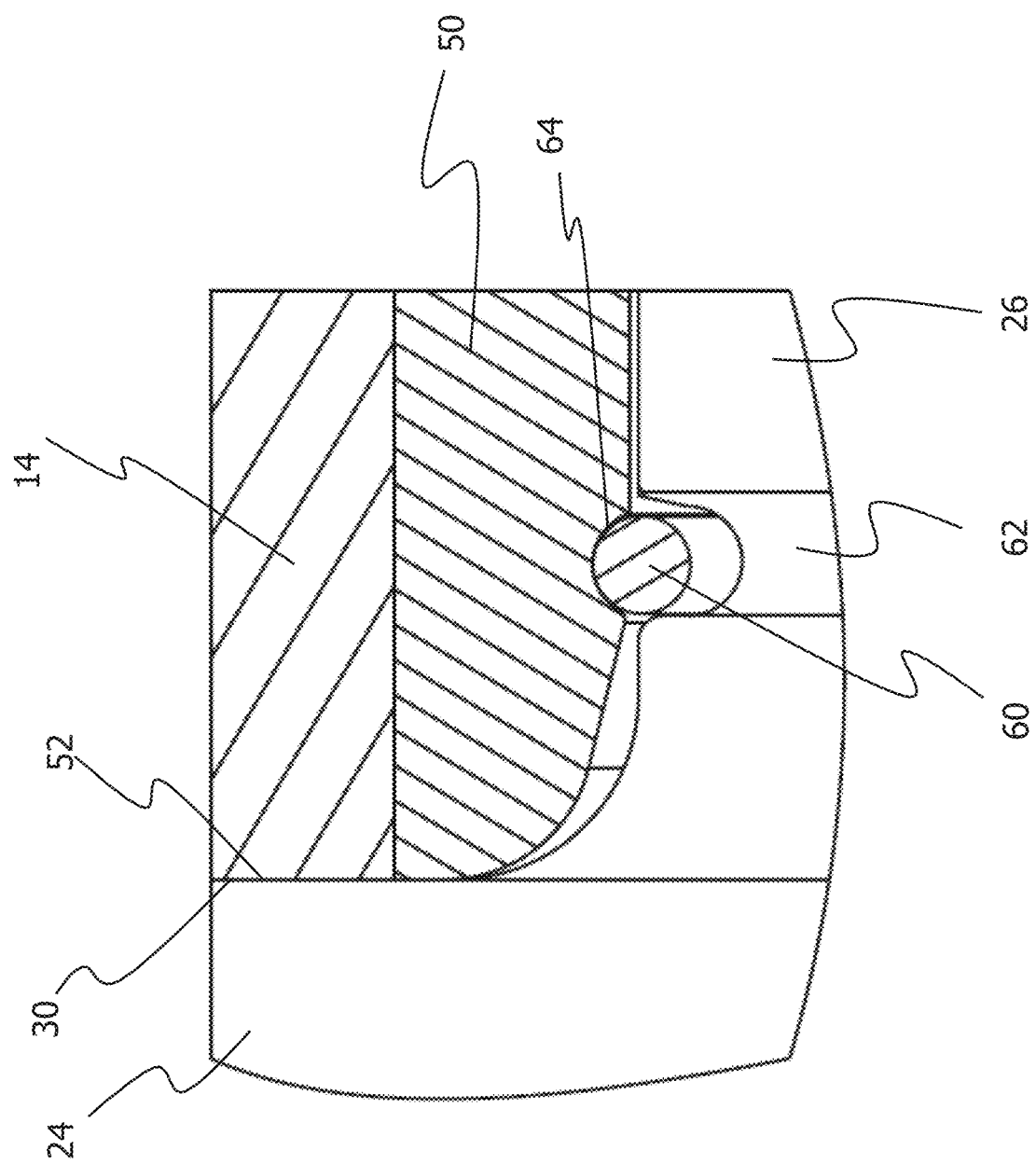
FIG. 7 illustrates an enlarged detail of the sectional view according to FIG. 6.

FIG. 6 shows a sectional view of a force input member 10 according to another embodiment. FIG. 7 shows an enlarged detail of the sectional view according to FIG. 6. The force input member 10 comprises the first portion 12 and the second portion 14, which are coupled to one another by means of a coupling device 16. The first portion 12 has a first coupling portion 22. The second portion 14 has a second coupling portion 32.

The first coupling portion 22 has the radial projection 24 and the axial guide projection 26, which projects in the axial direction from the radial projection 24. The guide projection 26 extends into an opening 34 of the second coupling portion 32. Accommodated in the opening 34 is the guide bush 50, which extends into the opening 34, starting from an axial end face 52. The opening 34 extends in portion 14 as far as the end portion 20 of the second portion 14. In the initial position of the force input member 10, which is shown in FIG. 6, the guide projection 26 projects beyond the guide bush 50 in the axial direction and extends almost as far as the end of the opening 34 in the second portion 14.

The second portion 14 is of stepped design. The opening 34 is likewise of stepped design, wherein the step 54 divides the opening 34 into a portion 56 of smaller diameter and a portion 58 of larger diameter. The portion 58 of larger diameter forms the coupling portion 32. The guide bush 50 is provided in the portion 58 of larger diameter. The guide bush 50 is supported on the step 54.

The coupling device 16 has a coupling element 60. The coupling element can be a clamping ring which is of slotted design. A recess 62 is formed in the guide projection 26 of the first coupling portion 22. On its inner circumferential surface, the guide bush 50 likewise has a recess 64. In the initial position of the force input member 10, in which the axial end face 52 of the second coupling portion 32 rests against the axial face 30 of the radial projection 24 of the first coupling portion 28, the recesses 62 and 64 are situated in the same position in the axial direction. The recess 64 in the inner circumferential surface of the guide bush 50 extends radially outward around the recess 62 in the outer circumferential surface of the guide portion 26 (see FIG. 7). In the initial position shown in FIGS. 6 and 7, the coupling element 60 engages in the recess 62 of the guide projection 26 and in the recess 64 of the guide bush 50. The coupling element 60 or clamping ring provides the predetermined holding or release force. If the release force is exceeded by a force acting on the force input member 10 in the direction of the arrow Z, the coupling element 60 is deformed elastically and thereby pushed into the recess 62 in the guide projection 26. Accordingly, a relative movement between the first portion 12 and the second portion 14 is possible. In other words, the telescopic function of the force input member 10 is enabled. Owing to the telescopic function, the force input member 10 is extended, wherein the portion between the end region 18 of the first portion 12 and the end region 20 of the second portion is enlarged.

Figure 8:
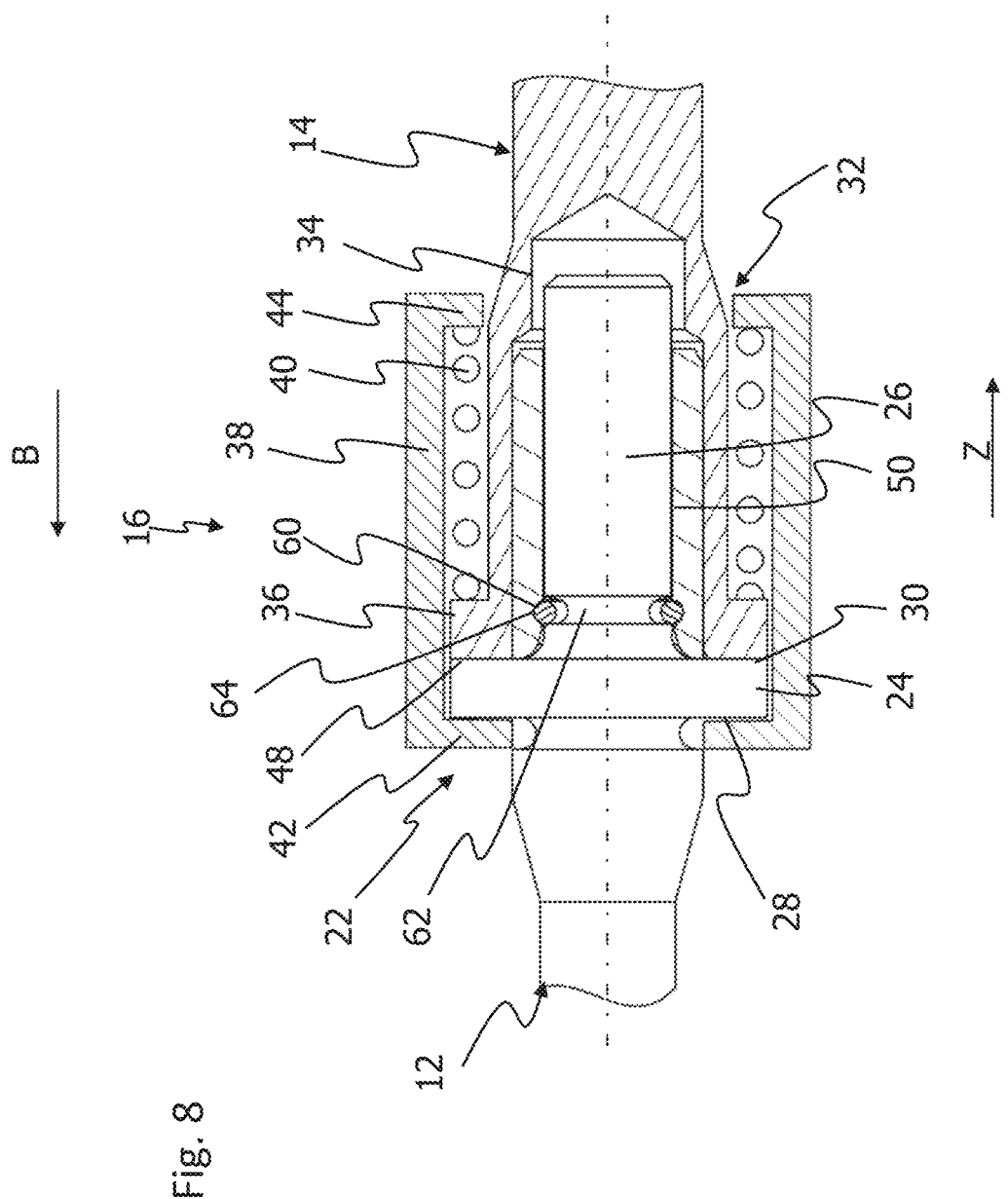
FIGS. 8 and 9 illustrate sectional views of a force input member according to another embodiment.
Figure 9:
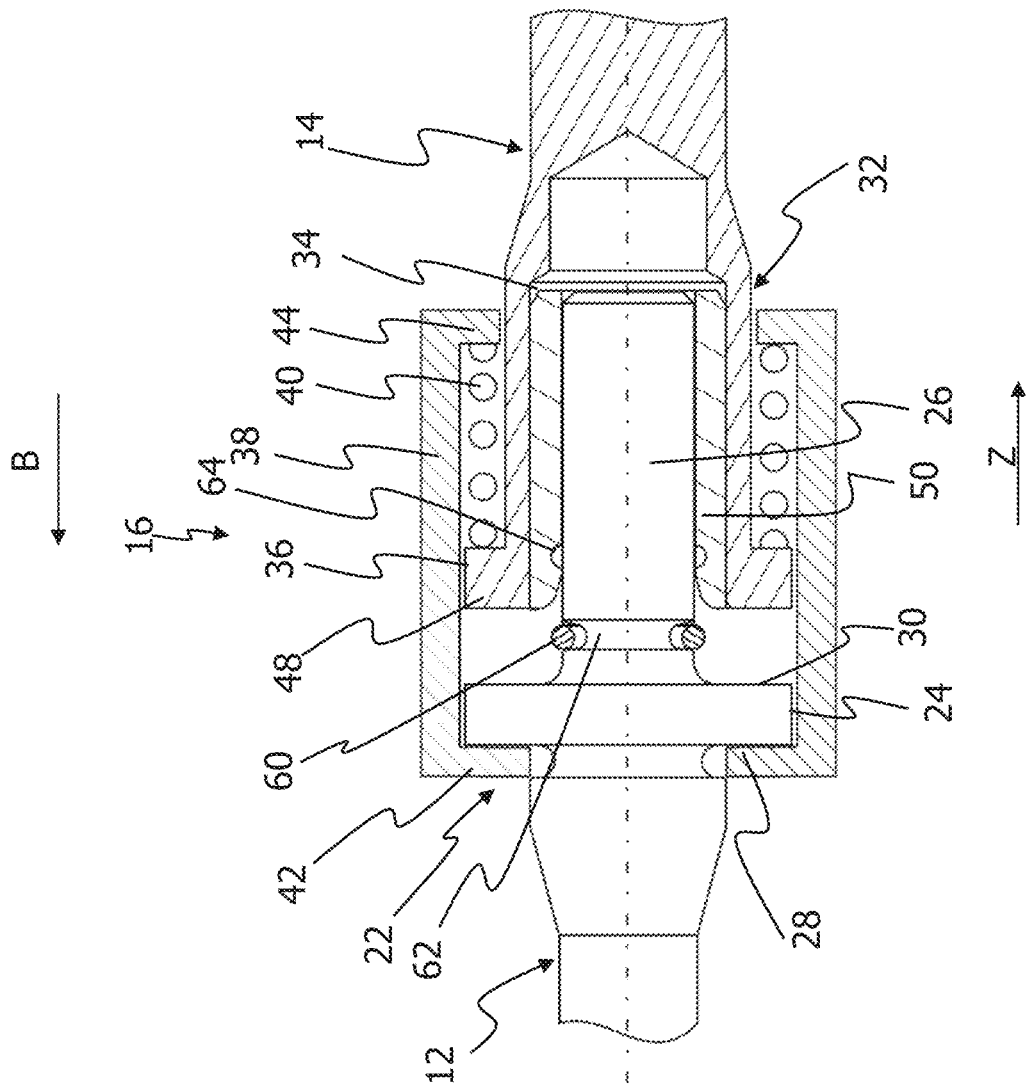

FIGS. 8 and 9 show a force input member 10 according to another embodiment. The embodiment shown in FIGS. 8 and 9 represents a combination of the two previously described embodiments.

The coupling device 16 has the housing part 38 and the return spring 40, which extends within the housing part 38. The return spring 40 is supported on the radial projection 36 of the second coupling portion 32 and the radial projection 44 of the housing part 38. The coupling device 16 furthermore has the annular coupling element 60. The coupling element 60 engages in the recess 62 in the guide projection 26 and the recess 64 in the guide bush 50. The coupling element 60 holds the coupling portions 22 and 32 or portions 12 and 14 in the initial position illustrated in FIG. 8. In the initial position, the axial face 48 of the radial projection 32 rests against the axial face 30 of the radial projection 24.

If the release force provided by the coupling element 60 is exceeded by a force acting on the force input member 10 in the direction of the arrow Z, the coupling element 60 is deformed elastically and pushed into the groove 62 in the guide projection 26. In this state, further relative movement between portion 12 and portion 14 is possible, compressing the return spring 40. This state is illustrated in FIG. 9. In the case of a relative movement between portions 12 and 14, the coupling element 60 remains in the recess 62 in the guide projection 26, even if the coupling element 60 is no longer in engagement with the guide bush 50.

In the case of a return movement into the initial position shown in FIG. 8, the coupling element 60 is pushed into the recess 62 again and then springs back into the recess 64 of the guide bush 50 when face 48 is brought into contact with face 30. The coupling element can then hold the two portions 12 and 14 in the initial position.

What is claimed is:

1. A force input member for a brake actuating device of a vehicle brake system, having:
   a first portion configured to be connected to the brake actuating device,
   a second portion configured to be connected to a brake pedal, and
   a coupling device for coupling the first portion and the second portion to one another and designed to permit a relative axial movement between the first portion and the second portion in the case of a force acting on the force input member which is greater than or equal to a predetermined release force;
   wherein the coupling device includes a permanent magnet that prevents relative movement between the first and second portions before the predetermined release force is exceeded and permits relative movement between the first and second portions after the predetermined release force is exceeded, wherein the force is a tensile force and the permanent magnet enables the first and second portions to move together axially without relative axial movement when the force acting on the force input element is less than the predetermined release force.

2. The force input member as defined in claim 1 wherein the coupling device couples a first coupling portion of the first portion to a second coupling portion of the second portion and the permanent magnet is provided on the second coupling portion.

3. The force input member as defined in claim 2 wherein the at least one further includes a guide bush provided radially between the first and second coupling portions and axially movable with one of the first and second coupling portions relative to the other of the first and second portions.

4. The force input member as defined in claim 3 wherein the coupling device has at least one housing part.

5. The force input member as defined in claim 4 wherein the coupling device has at least one return spring encircling the guide bush.

6. The force input member as defined in claim 3 wherein the first coupling portion has at least one radial projection.

7. The force input member as defined in claim 3 wherein the first coupling portion has at least one guide projection projecting in the axial direction.

8. The force input member as defined in claim 7 wherein the second coupling portion has at least one radial projection.

9. The force input member as defined in claim 8 wherein the second coupling portion at least partially accommodates the guide projection on the first coupling portion.

10. The force input member as defined in claim 1 wherein the permanent magnet is connected to and movable with the second portion and magnetically coupled to the first portion to prevent relative movement between the first and second portions until the predetermined release force is exceeded.

11. A force input member for a brake actuating device of a vehicle brake system, having:
    a first portion configured to be connected to the brake actuating device and including a first coupling portion,
    a second portion configured to be connected to a brake pedal and including a second coupling portion having a radially extending projection, and
    a coupling device for coupling the first portion and the second portion to one another and designed to permit a relative axial movement between the first portion and the second portion in the case of a force acting on the force input member which is greater than or equal to a predetermined release force;
    wherein the coupling device includes a housing part extending around the first and second coupling portions and a coil return spring supported on the radially extending projection of the second coupling portion and the housing part and encircling both the first coupling portion and the second coupling portion.

12. The force input member as defined in claim 3 wherein the force is a tensile force and first and second coupling portions move together axially without relative axial movement when the force acting on the force input member is less than the predetermined release force.

13. The force input member as defined in claim 11 wherein the coupling device further includes a guide bush provided radially between the first and second coupling portions and axially movable with one of the first and second coupling portions relative to the other of the first and second portions.

14. A force input member for a brake actuating device of a vehicle brake system, having:
   a first portion configured to be connected to the brake actuating device and including a first coupling portion,
   a second portion configured to be connected to a brake pedal and including a second coupling portion, and
   a coupling device for coupling the first portion and the second portion to one another and designed to permit a relative axial movement between the first portion and the second portion in the case of a force acting on the force input member which is greater than or equal to a predetermined release force;
   wherein the coupling device includes an elastic ring element that prevents relative movement between the first and second portions before the predetermined release force is exceeded and permits relative movement between the first and second portions after the predetermined release force is exceeded, wherein the elastic ring element is held within a pair of recesses of the coupling device before the predetermined release force is exceeded and moved out of one of the recesses in response to the predetermined release force being exceeded.

15. The force input member as defined in claim 14 wherein the elastic ring element is in contact with the first coupling portion and a guide bush within the second coupling portion.

16. The force input member as defined in claim 15 wherein the pair of recesses are formed in the first coupling portion and the guide bush.

17. The force input member as defined in claim 14 wherein the elastic ring element is radially compressed to permit relative movement between the first and second portions when the predetermined release force is exceeded.

18. The force input member as defined in claim 14 wherein the force is a tensile force and the elastic ring element enables the first and second coupling portions to move together axially without relative axial movement when the force acting on the force input member is less than the predetermined release force.

19. The force input member as defined in claim 14 wherein the coupling device further includes a guide bush provided radially between the first and second coupling portions and axially movable with one of the first and second coupling portions relative to the other of the first and second portions.

* * * * *